United States Patent [19]

Yoshimaru

[11] Patent Number: 5,339,303
[45] Date of Patent: Aug. 16, 1994

[54] APPARATUS FOR REPRODUCING INFORMATION FROM OPTICAL DISK ON WHICH INFORMATION IN RECORDED BY MARK LENGTH RECORDING

[75] Inventor: Tomohisa Yoshimaru, Yokohama, Japan

[73] Assignee: Kabushiki Kaisha Toshiba, Kawasaki, Japan

[21] Appl. No.: 737,489

[22] Filed: Jul. 30, 1991

[30] Foreign Application Priority Data

Jul. 31, 1990 [JP] Japan ............... 2-201533

[51] Int. Cl.$^5$ ................................. G11B 7/00
[52] U.S. Cl. ............................. 369/59; 369/48; 369/124; 307/261
[58] Field of Search ............ 369/48, 59, 124, 109, 369/110, 111, 116, 47, 54; 360/38.1, 33, 32, 40–43, 49; 307/261, 354, 360

[56] References Cited

U.S. PATENT DOCUMENTS

| | | | |
|---|---|---|---|
| 4,142,208 | 2/1979 | Oprandi et al. | 369/48 X |
| 4,475,183 | 10/1984 | Marchant et al. | 369/59 |
| 4,499,570 | 2/1985 | Immink et al. | 369/59 X |
| 4,685,098 | 8/1987 | Yoshida | 369/59 |
| 4,724,496 | 2/1988 | White . | |
| 4,819,222 | 4/1989 | Kimura | 369/59 X |
| 4,890,275 | 12/1989 | Mori | 369/59 |
| 5,001,698 | 3/1991 | Naito | 369/59 |
| 5,058,089 | 10/1991 | Yoshimaru et al. | 369/47 X |

FOREIGN PATENT DOCUMENTS

| | | |
|---|---|---|
| 0044073 | 1/1982 | European Pat. Off. . |
| 0133067 | 2/1985 | European Pat. Off. . |
| 58-189810 | 11/1983 | Japan . |
| 2098379 | 11/1982 | United Kingdom . |

OTHER PUBLICATIONS

Patent Abstracts of Japan, vol. 8, No. 38 (P-255) (1475) Feb. 18, 1984 & JP-A-58 189 810 (AKAI Denki K. K.) Nov. 5, 1983.

Primary Examiner—Aristotelis Psitos
Assistant Examiner—Thang V. Tran
Attorney, Agent, or Firm—Cushman, Darby & Cushman

[57] ABSTRACT

In this invention, in an optical disk on which information is recorded by a mark length recording method, an average value of detection signals of sync codes recorded on the optical disk beforehand is calculated, and a difference between the average value and a level "0" is determined to be a bias voltage. The bias voltage is superposed on a detection signal of the recorded information, and the signal is binarized by the level "0".

3 Claims, 15 Drawing Sheets

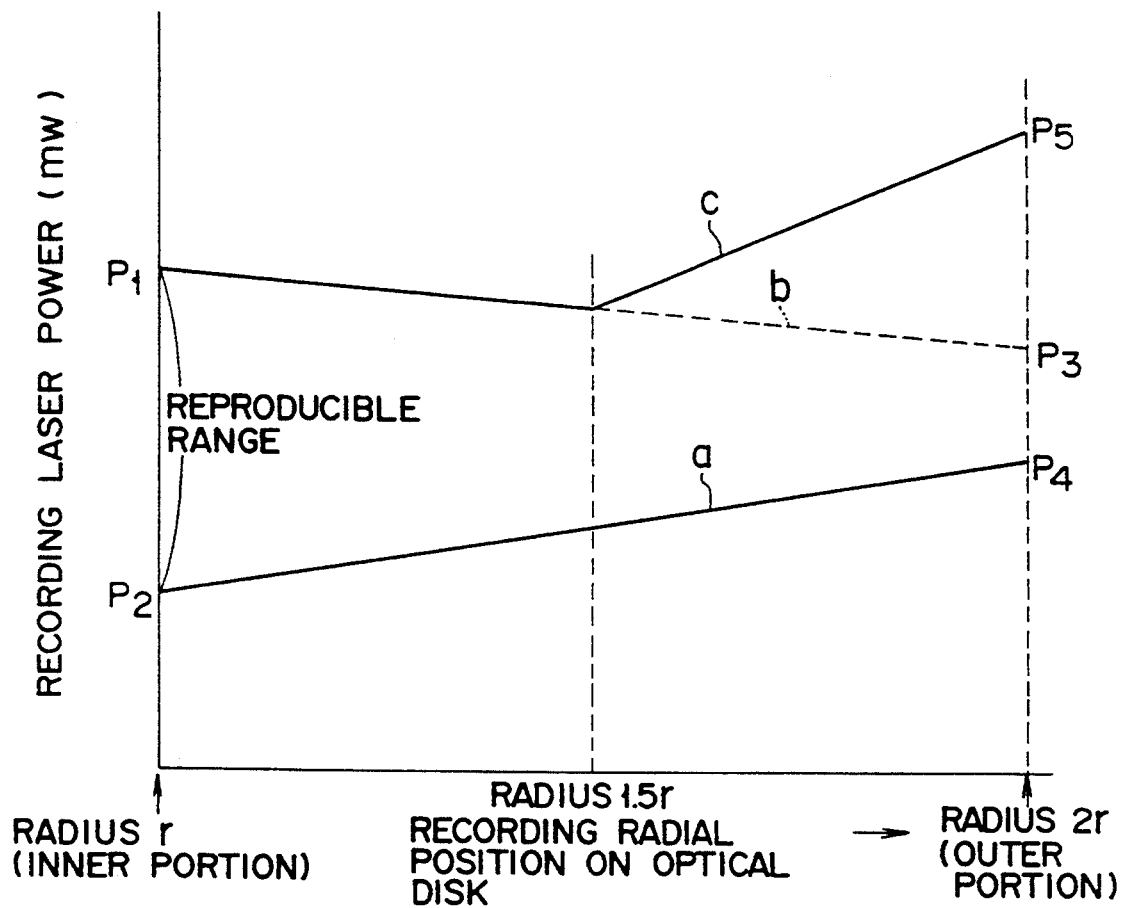
F I G. 16

APPARATUS FOR REPRODUCING INFORMATION FROM OPTICAL DISK ON WHICH INFORMATION IN RECORDED BY MARK LENGTH RECORDING

BACKGROUND OF THE INVENTION

1. Field of the Invention

The present invention relates to an electronic filing apparatus such as an apparatus for reproducing information from an optical disk on which information is recorded by mark length recording.

2. Description of the Related Art

In order to record information on an optical disk, a laser beam is focused into a fine light spot having a diameter of about 1 μm and modulated in accordance with information to be recorded, thereby thermally changing the state of a recording film on the surface of the optical disk to perform recording. Reproduction of information is performed by optically reading changes in light reflected by recorded pits (state change portions).

In this case, an optical head is used to perform recording or reproduction of information with respect to an optical disk. This optical head is constituted by, e.g., a semiconductor laser oscillator for generating a laser beam, an objective lens for guiding a laser beam from the semiconductor laser oscillator to an optical disk, and a converter for converting changes in light guided by the objective lens and reflected by pits formed on the optical disk into electrical signals (analog signals).

Focusing or tracking control is performed by adjusting a position of the objective lens relative to the optical disk.

A reproduction circuit is constituted by an amplifying circuit for amplifying the analog signals from the converter of the optical head, and a binarizing circuit for binarizing the amplified analog signals from the amplifying circuit at a predetermined slice level.

Two types of recording methods, i.e., mark position recording and mark length recording are used in such an optical disk.

In the mark position recording, recording is performed by expressing recording information by a length between pits formed on an optical disk to perform recording. In this case, recorded information is reproduced by using a signal which is switched in accordance with a predetermined position of each pit. This predetermined position is a leading edge portion, a trailing edge portion, or a central position of a pit.

In the mark length recording, recording is performed by expressing recording information by a width (length) of a pit and a distance (space length) between pits. In this case, recorded information is reproduced by detecting the pit width and the distance between pits. More specifically, recorded information is reproduced by using a signal which is switched in accordance with both of leading and trailing edge portions of each pit.

In order to record a certain amount of recording information, a larger number of small-diameter pits must be formed in an optical disk using the mark position recording than in an optical disk using the mark length recording. Therefore, a laser optical system of an optical disk using the mark position recording is complicated. In addition, since a frequency band of analog signals is high in an optical disk using the mark position recording, its analog circuit such as an amplifying circuit is complicated.

Therefore, in order to perform high-density recording using an optical disk, the mark length recording is adopted.

when the mark length recording is used, a reflected light amount is changed (decreased) due to changes in focus offset, film sensitivity, and laser intensity. Therefore, a ratio of a pit width to a length between pits is largely shifted from a proper value. That is, the level of an analog signal in the binarizing circuit becomes lower than a proper level. Therefore, if binarization is performed at a predetermined threshold level, a signal indicating the leading and trailing edge portions of a pit is switched at a position shifted from an actual position.

As a result, since correct detection of a pit width (correct detection of both the leading and trailing edge portions of a pit) and correct detection of a length between pits become difficult to perform, erroneous reproduction is caused.

SUMMARY OF THE INVENTION

It is an object of the present invention to provide a reproducing apparatus capable of correctly detecting a pit width and a distance between pits even when a reflected-light amount is changed due to changes in focus offset, film sensitivity, and laser intensity, thereby preventing erroneous reproduction.

It is another object of the present invention to provide a reproducing apparatus capable of correctly detecting a pit width and a distance between pits even when a reflected light amount is changed due to an effect of, e.g., distortion of an analog circuit or a binarizing circuit, thereby preventing erroneous reproduction.

In order to achieve the above objects of the present invention, there are provided a reproducing apparatus comprising detecting means for detecting a fixed code and an information signal recorded beforehand in a recording medium, determining means for determining a bias voltage in accordance with a detection signal of the fixed code from the detecting means, superposing means for superposing the bias voltage determined by the determining means on a detection signal of the information signal from the detecting means, and binarizing means for binarizing a signal from the superposing means by a predetermined binarization level.

In order to achieve the above objects of the present invention, there are provided a reproducing apparatus comprising detecting means for detecting a fixed code and an information signal recorded beforehand in a recording medium, determining means for determining a binarization level in accordance with a detection signal of the fixed code from the detecting means, and binarizing means for binarizing a detection signal of the information signal from the detecting means by the binarization level determined by the determining means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 16 is a graph for explaining recording laser power as a function of a radial position on the optical disk shown in FIG. 1.

DETAILED DESCRIPTION OF THE PREFERRED EMBODIMENTS

Figure 1:
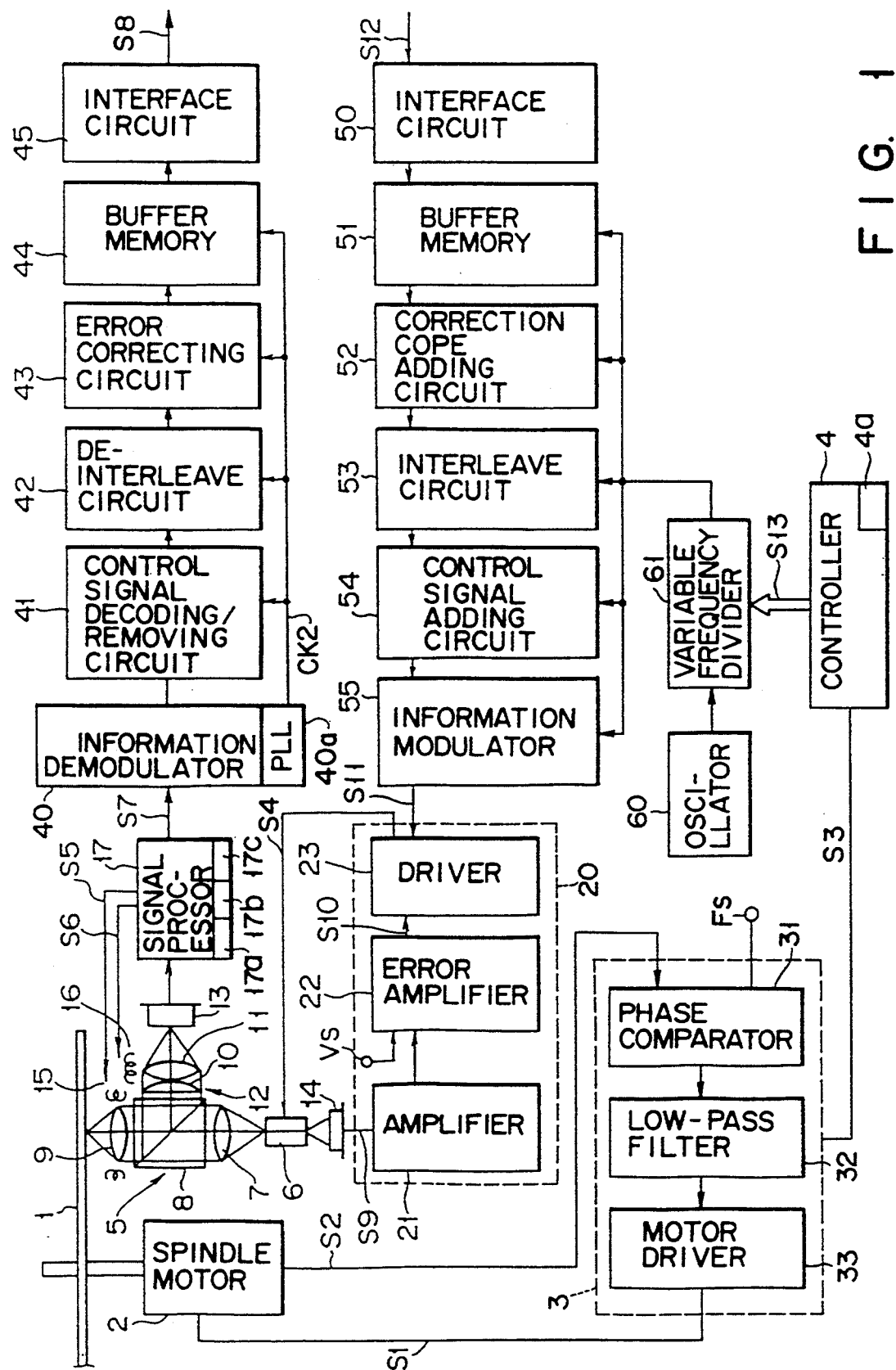
FIG. 1 is a block diagram schematically showing an arrangement of an optical disk apparatus of the present invention.

FIG. 1 schematically shows an arrangement of an embodiment of an optical disk apparatus as a recording-/reproducing apparatus of the present invention.

An optical disk 1 used as an information recording medium in the optical disk apparatus shown in FIG. 1 is manufactured by coating a donut-like metal coating layer consisting of, e.g., tellurium or bismuth on the surface of a disk-like glass or plastic substrate. A notched portion, i.e., a reference mark $1_1$ is formed near the central portion of the metal coating layer.

Figure 2:
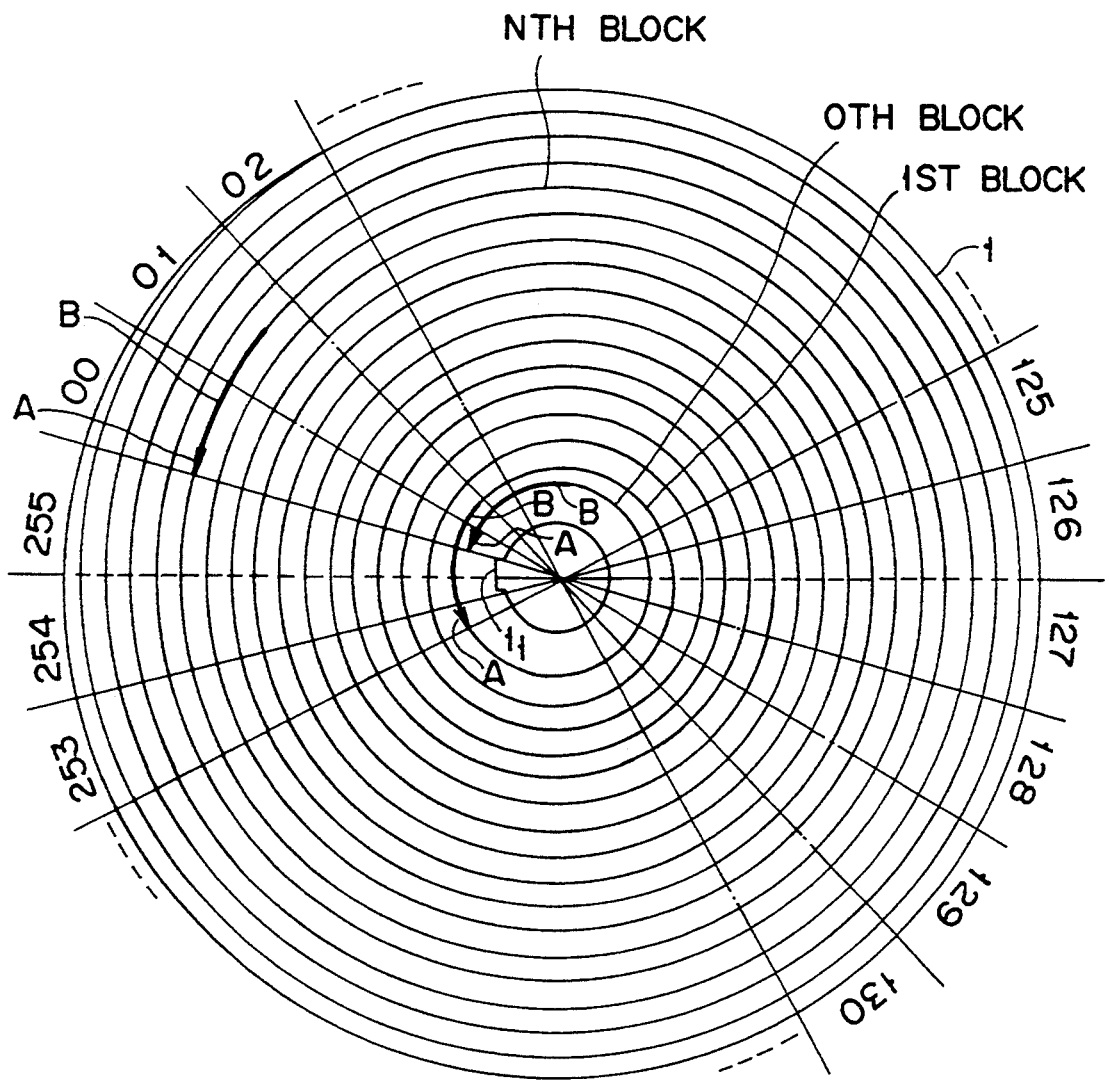
FIG. 2 is a plan view showing an arrangement of an optical disk shown in FIG. 1.

As shown in FIG. 2, tracks for recording information are formed concentrically or spirally on the optical disk 1. These tracks are divided into 256 sectors of "0 to 255" from the reference mark $1_1$ as a sector "0".

A plurality of fixed-length blocks for recording information are provided on the optical disk 1. The number of sectors corresponding to one block is changed in accordance with the position of a block. Variable-length information is recorded over a plurality of blocks.

In the start position of each block, a block header (header information) A constituted by, e.g., a fixed code such as a sync code, a block number, and a track number is recorded. The block header A is recorded in the manufacture of the optical disk 1. Information is recorded in an area B subsequent to the block header A. If a block is not ended at a switch position between sectors, a block gap is formed so that every block is always started from a position corresponding to the switch position between sectors.

As the fixed code, a code in which a ratio of a pit width to a length between pits is 1:1 is used. Alternatively, a code having a ratio of 1:n (n=2, 3, ..., ) may be used.

As shown in FIG. 1, the optical disk 1 having the above arrangement is mounted on a spindle motor 2, and the motor 2 rotates the optical disk 1 at a predetermined rotation speed. Start, stop, or the like of rotation of the spindle motor 2 is controlled by a control signal S1 supplied from a spindle motor controller 3. The spindle motor 2 outputs a rotation pulse signal S2 corresponding to its rotation speed.

The spindle motor controller 3 is constituted by a phase comparator 31, a low-pass filter 32, and a motor driver 33.

The phase comparator 31 compares the phase of a signal Fs supplied from a frequency oscillator (not shown) and having a reference frequency with that of the rotation pulse signal S2 supplied from the spindle motor 2, and outputs the comparison result to the low-pass filter 32. The low-pass filter 32 removes a high-frequency component from the output signal supplied from the phase comparator 31 and outputs the signal to the motor driver 33. The motor driver 33 amplifies the output signal from the low-pass filter 32 and outputs the amplified signal to the spindle motor 2, thereby driving the motor 2 to rotate.

In accordance with a control signal S3 supplied from a controller 4, the spindle motor controller 3 outputs the control signal S1 correctly synchronized with the reference-frequency signal Fs to the spindle motor 2. The spindle motor 2 is correctly rotated at a predetermined rotation speed.

The controller 4 is constituted by, e.g., a microcomputer and performs various control operations (to be described later) in addition to the rotation control of the spindle motor 2.

As shown in FIG. 1, an optical head 5 is located on the lower surface side of the optical disk 1. The optical head 5 performs recording or reproduction of information with respect to the optical disk 1.

The optical head 5 is constituted by, e.g., a semiconductor laser oscillator 6, a collimator lens 7, a beam splitter 8, an objective lens 9, an astigmatism optical system 12, photodetectors 13 and 14, and lens actuators 15 and 16.

The astigmatism optical system 12 is a well-known system constituted by a cylindrical lens 10 and a convex lens 11.

The optical head 5 is arranged to be moved in the radial direction of the optical disk 1 by a moving mechanism (not shown) constituted by, e.g., a linear motor. The optical head is moved to a target track as an object of recording or reproduction in accordance with a command from the controller 4.

The semiconductor laser oscillator 6 generates a divergent laser beam corresponding to a drive signal S4 supplied from an optical output controller 20. In order to record mark-length information on the optical disk 1, the semiconductor laser oscillator 6 generates a laser beam having a light intensity modulated in correspondence with the information to be recorded. To read out and reproduce information from the optical disk 1, the semiconductor laser oscillator 6 generates a laser beam having a predetermined light intensity.

A divergent laser beam generated by the semiconductor laser oscillator 6 is converted into a collimated beam by the collimator lens 7 and guided to the beam splitter 8. The laser beam guided to the beam splitter 8 is incident on the objective lens 9 through the beam splitter 8. The laser beam incident on the objective lens 9 is focused by the lens 9 on the recording film of the optical disk 1.

The objective lens 9 is supported to be movable in its optical axis direction by the lens actuator 15 as a lens driving mechanism. The objective lens 9 is also supported to be movable in a direction perpendicular to the optical axis by the lens actuator 16 as another lens driving mechanism. Each of the lens actuators 15 and 16 are constituted by, e.g., a coil.

The photodetector 13 is constituted by four photodetecting cells (not shown) for converting light focused by the astigmatism optical system 12 into an electrical signal. A signal output from the photodetector 13 is supplied to a signal processor 17.

The signal processor 17 performs various processing in accordance with the detection signal from the photodetector 13. The signal processor 17 is constituted by a focus servo circuit 17a, a tracking servo circuit 17b, and an information reproduction processor 17c.

The focus servo circuit 17a is a well-known circuit for outputting a focus servo signal S5 in accordance with the detection signal from the photodetector 13. The tracking servo circuit 17b is a well-known circuit for outputting a tracking servo signal S6 in accordance with the detection signal from the photodetector 13.

The lens actuator 15 moves the objective lens 9 in the optical axis direction by the focus servo signal S5 supplied from the focus servo circuit 17a. By this movement of the objective lens 9 in the optical axis direction, a convergent light beam focused through the lens 9 is projected on the surface of the optical disk 1, thereby forming a minimum beam spot of the laser beam on the surface of the recording film of the optical disk 1. In this state, the beam spot of the laser beam focused by the objective lens 9 is set in an in-focus state.

The lens actuator 16 moves the objective lens 9 in the direction perpendicular to the optical axis by the tracking servo signal S6 supplied from the tracking servo circuit 17b. By this movement of the objective lens 9 in the direction perpendicular to the optical axis, a convergent laser light focused through the lens 9 is radiated on a recording track formed on the surface of the recording film of the optical disk 1. In this state, a beam spot of the laser beam focused by the objective lens 9 is set in an in-track state.

When a beam spot of a laser beam is set in both the in-focus and in-track states as described above, write (recording) and read (reproduction) operations of information can be performed.

In the in-focus state, a divergent laser beam reflected by the optical disk 1 is converted into a collimated beam by the objective lens 9 and returned to the beam splitter 8. The laser beam returned to the beam splitter 8 is reflected by the splitter 8 and guided onto the photodetector 13 by the astigmatism optical system 12. An image corresponding to the laser beam from the astigmatism optical system 12 is formed on the photodetector 13. On the photodetector 13, a focus shift appears as a change in shape, and a tracking shift appears as an imaging position shift.

Figure 3:
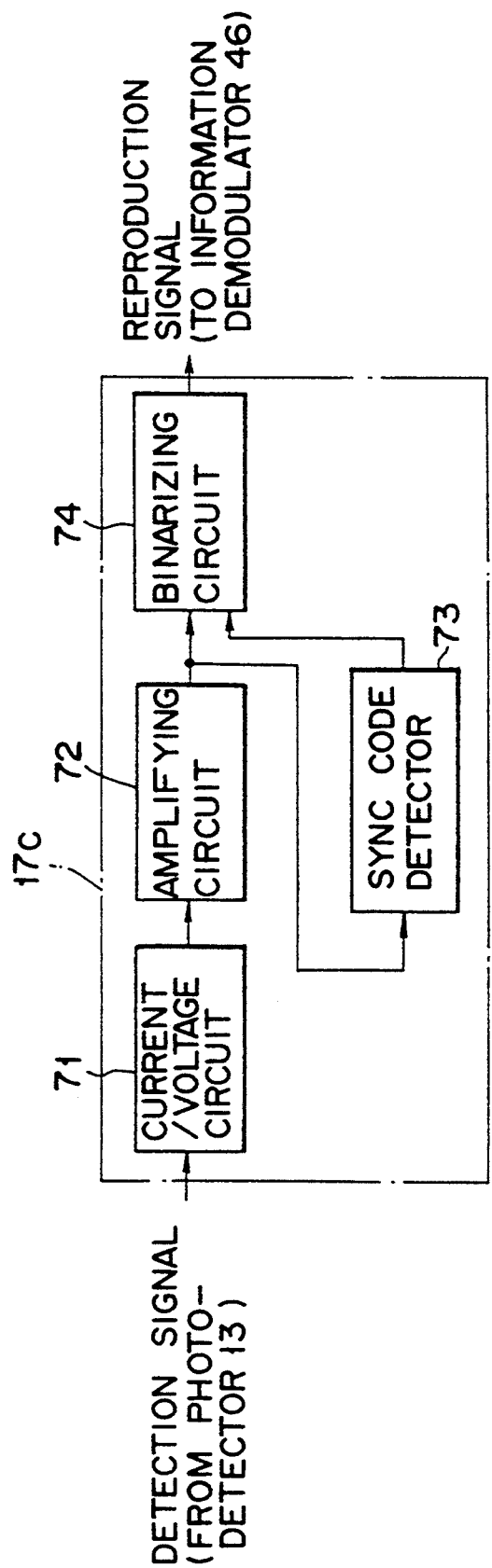
FIG. 3 is a block diagram showing a schematic arrangement of an information reproduction processor.

The information reproduction processor 17c outputs a reproduction signal S7 in accordance with the detection signal supplied from the photodetector 13. As shown in FIG. 3, the information reproduction processor 17c is constituted by a current/voltage converter 71, an amplifying circuit 72, a fixed code detector 73, and a binarizing circuit 74.

The current/voltage converter 71 converts a current value as the detection signal supplied from the photodetector 13 into a voltage value (analog signal) and outputs the voltage value to the amplifying circuit 72.

The amplifying circuit 72 amplifies the voltage value supplied from the current/voltage converter 71 and outputs the amplified voltage signal to the fixed code detector 73 and the binarizing circuit 74.

The fixed code detector 73 detects a fixed code such as a sync code in accordance with the voltage signal supplied from the amplifying circuit 72 and outputs a switch signal to the binarizing circuit 74 in accordance with the detection result.

The binarizing circuit 74 determines a bias at which an average value of the voltage signals supplied from the amplifying circuit 72 in correspondence with the switch signals supplied from the fixed code detector 73 is rendered "0 volt". The binarizing circuit 74 binarizes voltage signals supplied from the amplifying circuit 72 after the fixed code while applying the determined bias and outputs the binary signals as reproduction signals S7.

The binarizing circuit 74 effectively functions when a ratio of level "HIGH" to level "LOW" (a ratio of ON to OFF) is 1:1 upon binarization at a threshold level of "0 volt".

The reproduction signal S7 output from the binarizing circuit 74 indicates information recorded on the optical disk 1.

Figure 4:
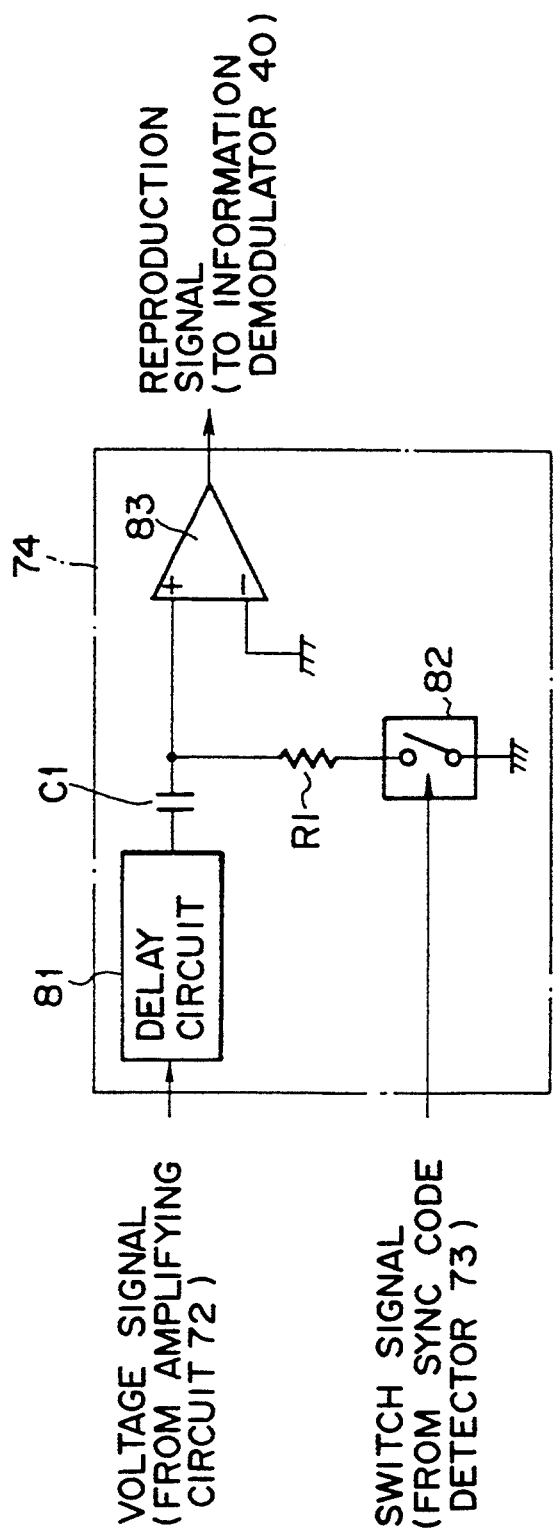
FIG. 4 is a circuit diagram showing a schematic arrangement of a binarizing circuit shown in FIG. 3.

As shown in FIG. 4, the binarizing circuit 74 is constituted by a delay circuit 81, a capacitor C1, a resistor R1, a switch 82, and a comparator 83.

Figure 5:
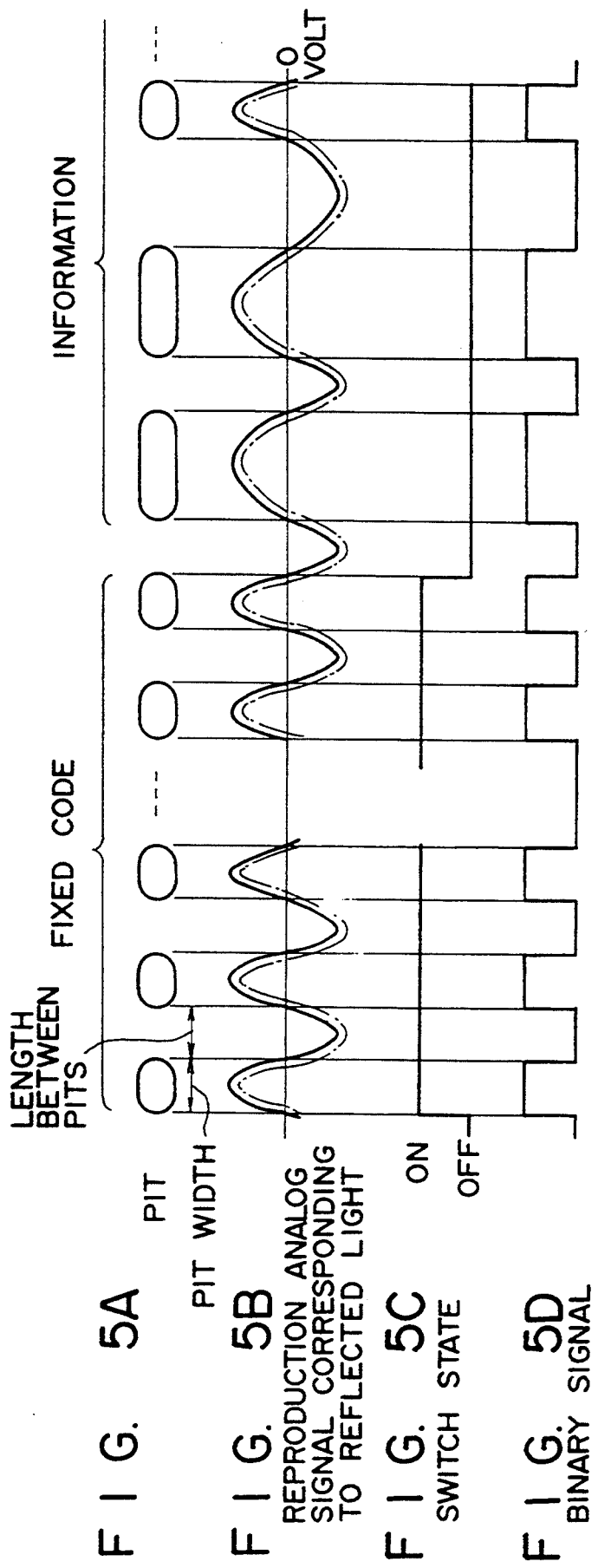
FIGS. 5A and 7A are timing charts each showing a recording state of a pit.
FIGS. 5B, 5C, and 5D are timing charts showing signal waveforms of main parts of the binarizing circuit shown in FIG. 3.

The delay circuit 81 delays the voltage signal supplied from the amplifying circuit 72 by the detection time of the fixed code detector 73. As indicated by an alternate long and short dashed line in FIG. 5B, the level of an output signal from the delay circuit 81 is lower than a proper level due to changes in focus offset, film sensitivity, and laser intensity. The switch 82 is kept ON while the fixed code detector 73 supplies the switch signal, as shown in FIG. 5C.

A CR circuit constituted by the capacitor C1 and the resistor R1 calculates a bias voltage at which an average value of AC voltage signals supplied from the delay circuit 81 and corresponding to the fixed code is rendered "0 volt".

In the binarizing circuit 74, the switch 82 is turned on in accordance with the switch signal obtained by delaying, by the delay circuit 81, the voltage signal supplied from the amplifying circuit 72 by the detection time of the fixed code detector 73 and supplied from the fixed code detector 73, the CR circuit constituted by the capacitor C1 and the resistor R1 calculates the bias voltage at which the average value of AC voltage signals corresponding to the fixed code from the delay circuit 81 is rendered "0 volt", and the calculated bias voltage, i.e., the voltage at the node between the capacitor C1 and the resistor R1 is applied to the noninverting input terminal of the comparator 83.

When the fixed code detector 73 no longer supplies any switch signal, the binarizing circuit 74 turns the switch 82 off so that a bias voltage at this time is kept applied to the comparator 83.

As a result, a sine wave indicated by a solid line in FIG. 5B and having "0 volt" as its average value is obtained with respect to the fixed code shown in FIG. 5A, and a signal waveform in which an analog signal corresponding to the edge portion of a pit of recorded data crosses the threshold level of "0 volt", as shown in FIG. 5B, is obtained with respect to information following the fixed code shown in FIG. 5A. For this reason, as shown in FIG. 5D, a binary signal correctly indicating the positions of the leading and trailing edge portions of a pit can be obtained.

Therefore, since a pit width and a distance between pits can be correctly detected, erroneous reproduction can be prevented.

Figure 6:
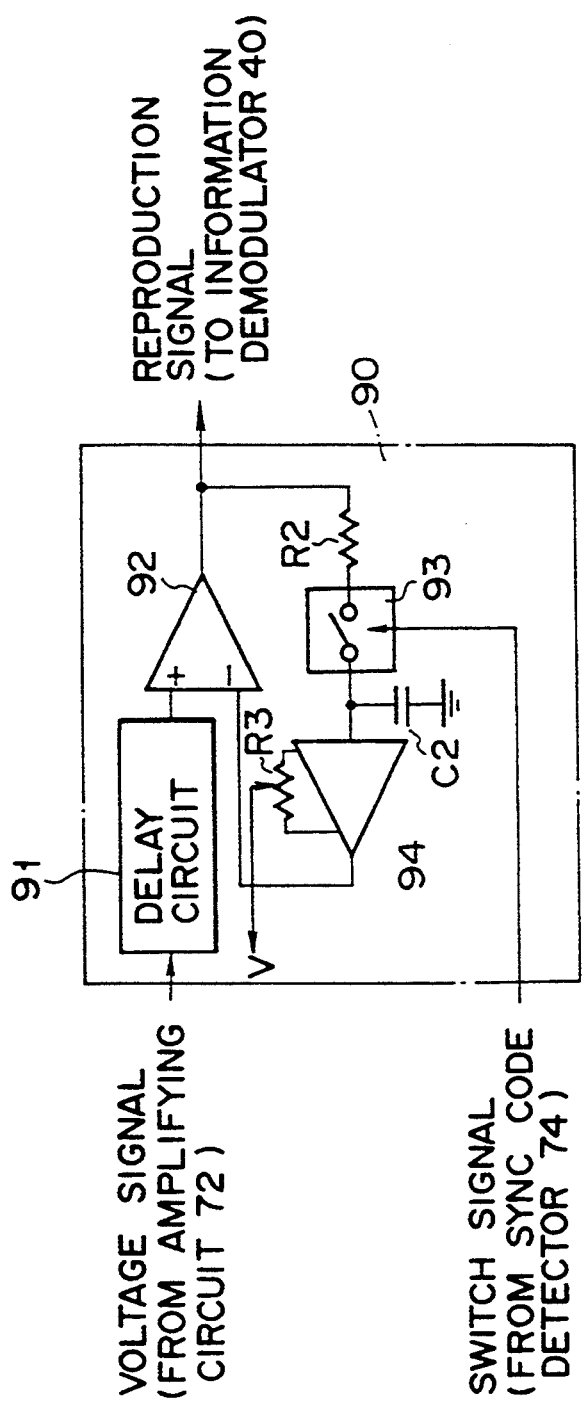
FIG. 6 is a circuit diagram showing another arrangement of the binarizing circuit shown in FIG. 3.

As the binarizing circuit, a negative feedback type binarizing circuit 90 shown in FIG. 6 may be used. As shown in FIG. 6, the binarizing circuit 90 is constituted by a delay circuit 91, a comparator 92, a resistor R2, a switch 93, a capacitor C2, an amplifier 94, and a variable resistor R3 connected to the amplifier 94.

The delay circuit 91 delays the voltage signal supplied from the amplifying circuit 72 by the detection time of the fixed code detector 73. As indicated by an alternate long and short dashed line in FIG. 7B, the level of an output signal from the delay circuit 91 is lower than a proper level due to changes in focus offset, film sensitivity, and laser intensity. In addition, the signal is shifted in the time axis direction by an effect of, e.g., distortion in the analog circuit or the binarizing circuit.

The binarizing circuit 90 determines a threshold level in accordance with an average value of the binary signals of the voltage signals supplied from the amplifying circuit 72 and corresponding to the switch signal supplied from the fixed code detector 73. The binarizing circuit 90 binarizes voltage signals supplied after the fixed code from the amplifying circuit 72 by the determined threshold level and output the binary signals as reproduction signals S7.

Figure 7:
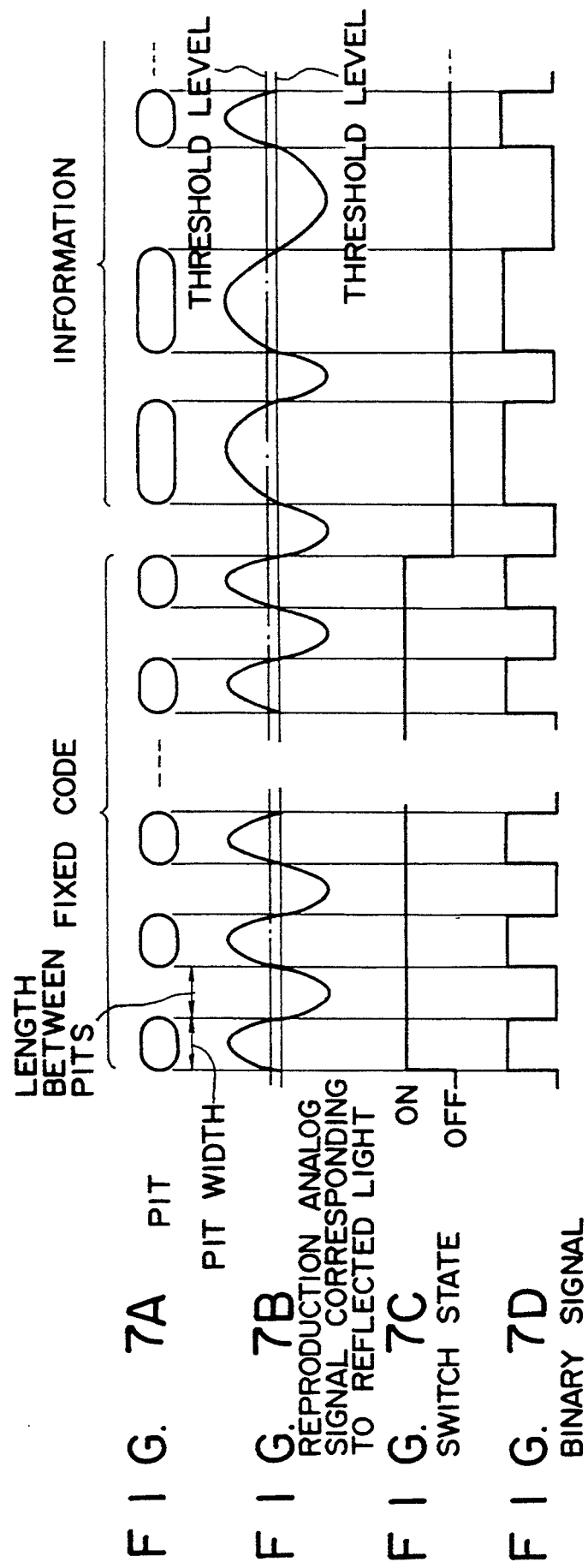
FIGS. 7B, 7C, and 7D are timing charts showing signal waveforms of main parts of the binarizing circuit shown in FIG. 6.

That is, in the binarizing circuit 90, the switch 93 is turned on in accordance with the switch signal supplied from the fixed code detector 73, as shown in FIG. 7C, a CR circuit constituted by the capacitor C2 and the resistor R2 detects an average value of binary outputs (digital signals) from the comparator 92, and a signal obtained by amplifying the detected average voltage value by the amplifier 94 is output to the inverting input terminal of the comparator 92 as a threshold level.

When the fixed code detector 73 no longer supplies any switch signal, the binarizing circuit 90 turns the switch 93 off so that a threshold level at this time is kept applied to the comparator 92.

Therefore, the comparator 92 binarizes voltage signals supplied after the fixed code from the amplifying circuit 72 by the threshold level from the amplifier 94 and outputs the binary signals as reproduction signals S7.

Assuming that the loop gain of a negative feedback section constituted by the comparator 92, the resistor R2, the capacitor C2, and the amplifier 94 is G, an effect caused by distortion of the analog circuit or the binarizing circuit can be reduced to be $1/(G+1)$. When the loop gain G is set to be 10 to 20, the effect of distortion of the analog circuit or the binarizing circuit essentially disappears.

As a result, a threshold level indicated by a solid line in FIG. 7B is obtained with respect to the fixed code shown in FIG. 7A, and an analog signal corresponding to the edge portion of a pit of recorded data crosses the threshold level, as shown in FIG. 7B, with respect to information following the fixed code shown in FIG. 7A.

For this reason, as shown in FIG. 7D, a binary signal correctly indicating the positions of leading and trailing edge portions of a pit can be obtained.

Therefore, since a ratio of a pit width to a distance between pits can be prevented from being shifted by an effect of distortion of the analog circuit or the binarizing circuit, the pit width and the distance between pits can be correctly detected to prevent erroneous detection.

In order to obtain a predetermined value as a ratio of ON to OFF of the analog signal corresponding to the fixed code, the resistance of the variable resistor R3 is preset to adjust the bias voltage of the amplifier 94 beforehand.

The reproduction signal S7 from the binarizing circuit 74 (or 90) of the information reproduction processor 17c is output to an information demodulator 40.

The information demodulator 40 shown in FIG. 1 demodulates the reproduction signal S7 from the information reproduction processor 17c of the signal processor 17 and outputs the demodulated signal to a control signal decoding/removing circuit 41. The circuit 41 detects and removes, e.g., the sync code added upon recording, thereby extracting only recorded information. The information extracted by the control signal decoding/removing circuit 41 is supplied to a deinterleave circuit 42.

The deinterleave circuit 42 restores information rearranged by interleaving to improve possibility of error correction upon recording. An output from the deinterleave circuit 42 is supplied to an error correcting circuit 43. The circuit 43 corrects errors of one bit or two or more bits of the deinterleft information. The reproduction information in which errors are corrected by the error correcting circuit 43 is supplied to a buffer memory 44 and externally output as a reproduction signal S8 via an interface circuit 45 for exchanging information.

As shown in FIG. 1, the photodetector 14 is located at a position on the opposite side of a light-emitting hole of the semiconductor laser oscillator 6 for emitting a laser beam for recording or reproduction so as to face the light-emitting hole. The photodetector 14 is constituted by a photoelectric conversion element. Upon receiving monitor light from the semiconductor laser oscillator 6, the photodetector 14 converts the monitor light into an electrical signal (photocurrent). The photodetector 14 outputs the electrical signal to the optical output controller 20 as an optical output monitor signal S9 of the semiconductor laser oscillator 6.

The controller 20 performs feedback control using the optical output monitor signal S9 supplied from the photodetector 14 to maintain the optical output from the semiconductor laser oscillator 6 constant. As shown in FIG. 1, the optical output controller 20 is constituted by an amplifier 21, an error amplifier 22, and a driver 23.

The amplifier 21 converts the optical output monitor signal S9 from the photodetector 14 into a voltage signal corresponding to the optical intensity received by the photodetector 14, i.e., the optical output from the semiconductor laser oscillator 6, amplifies the converted signal, and outputs the amplified signal to the error amplifier 22.

The error amplifier 22 compares the output signal from the amplifier 21 with a reference voltage vs supplied from a constant voltage source (not shown) and outputs the difference to the driver 23 as an error signal S10. The reference voltage Vs is a constant voltage for obtaining an optical output required for reproduction. A constant optical output can be obtained from the semiconductor laser oscillator 6 by feedback control performed to bring the output voltage from the amplifier 21 near the reference voltage Vs.

Figure 8:
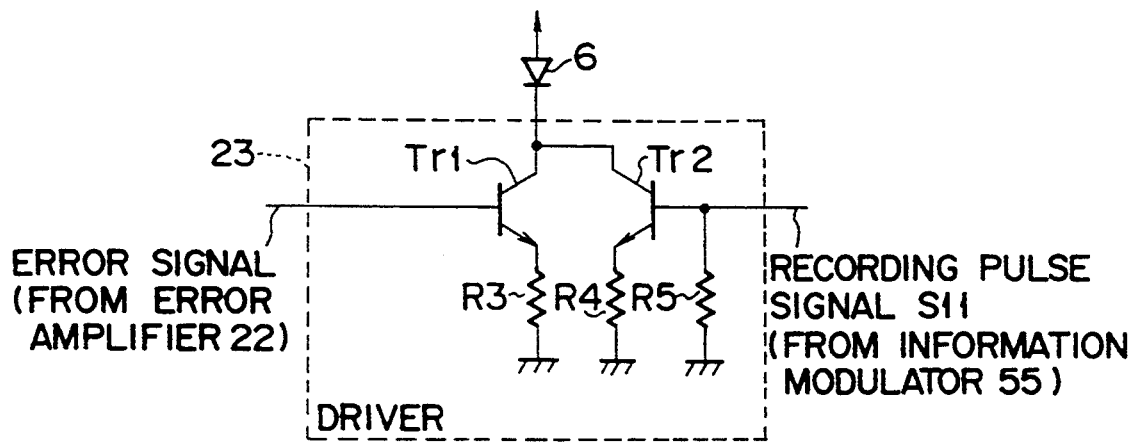
FIG. 8 is a circuit diagram showing an arrangement of a driver of an optical output controller shown in FIG. 1.

As shown in FIG. 8, the driver 23 is constituted by two transistors Tr1 and Tr2 and resistors R3, R4, and R5.

A recording pulse signal S11 supplied from an information modulator 55 (to be described later) and corresponding to information to be recorded is supplied to the base of the transistor Tr2 of the driver 23. As a result, an optical output for recording is output from the semiconductor laser oscillator 6.

The base of the transistor Tr1 of the driver 23 receives the error signal S10 from the error amplifier 22 upon reproduction, and receives, upon recording, a voltage signal which is a voltage value supplied in the immediately preceding reproduction and held by a sample-and-hold circuit (not shown).

An interface circuit 50 exchanges recording information S12 supplied from an external apparatus (optical disk control apparatus) (not shown). An output from the interface circuit 50 is supplied to a buffer memory 51. The memory 51 stores the recording information supplied from the interface circuit 50. An output from the buffer memory 51 is supplied to a correction code adding circuit 52.

The circuit 52 adds a redundant code for enabling correction to the recording information supplied from the buffer memory 51. An output from the correction code adding circuit 52 is supplied to an interleave circuit 53. The circuit 53 rearranges the recording information supplied from the correction code adding circuit 52. This rearrangement of recording information is performed to improve possibility of correction upon generation of a burst error. In the rearrangement, recording positions of a series of pieces of information are scattered. An output from the interleave circuit 53 is supplied to a control signal adding circuit 54.

The control signal adding circuit 54 adds a control code such as a sync code to the recording information rearranged in the interleave circuit 53. An output from the control signal adding circuit 54 is supplied to an information modulator 55. The information modulator 55 digitally modulates the recording information into a signal suitable for recording. This digital modulation is performed by referring to a ROM (not shown). The information modulator 55 supplies the recording pulse signal S11 as serial information to the driver 23 via a register (not shown). The driver 23 drives the semiconductor laser oscillator 6 in accordance with the recording pulse signal S11 supplied from the information modulator 55 to record the information on the optical disk 1.

The operations of the buffer memory 51, the correction code adding circuit 52, the interleave circuit 53, the control signal adding circuit 54, and the information modulator 55 are synchronized with an information transfer clock CK1. This clock CK1 is generated by frequency-dividing an output from an oscillator 60, which oscillates at a constant frequency, into predetermined frequencies by a variable frequency divider 61.

The variable frequency divider 61 frequency-divides the clock signal of a constant frequency supplied from the oscillator 60 by a frequency dividing ratio based on set information S13 supplied from the controller 4 and outputs the frequency-divided signal as the information transfer clock CK1. The set information S13 is stored in a conversion table 4a, which is constituted by a ROM provided in the controller 4, in correspondence with a track number, a block number, and the like as address information of the optical disk 1.

Figure 9:
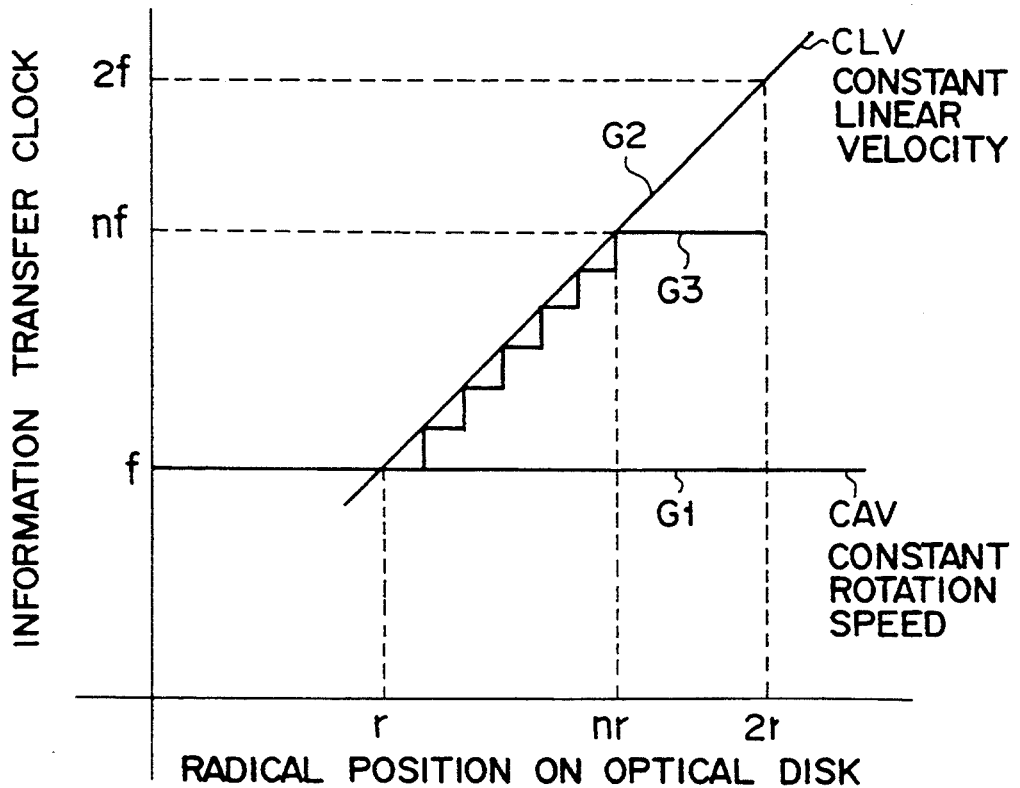
FIG. 9 is a graph for explaining stored contents of a conversion table stored in the controller shown in FIG. 1.

The conversion table 4a stores the set information S13 by which a characteristic curve G3 as shown in FIG. 9, for example, is obtained. The curve G3 indicates a characteristic in which the frequency of the information transfer clock CK1 is increased stepwise in proportion to an outward movement of the radial position on the optical disk 1, i.e., in proportion to an increase in track number and is rendered constant from a certain radial position nr.

A characteristic curve G1 shown in FIG. 9 indicates a characteristic of the information transfer clock CK1 obtained in a CAV (Constant Angular Velocity; a rotation speed is constant) method. As shown in FIG. 9, information is recorded at a constant frequency regardless of the radial position on the optical disk 1.

Figure 10:
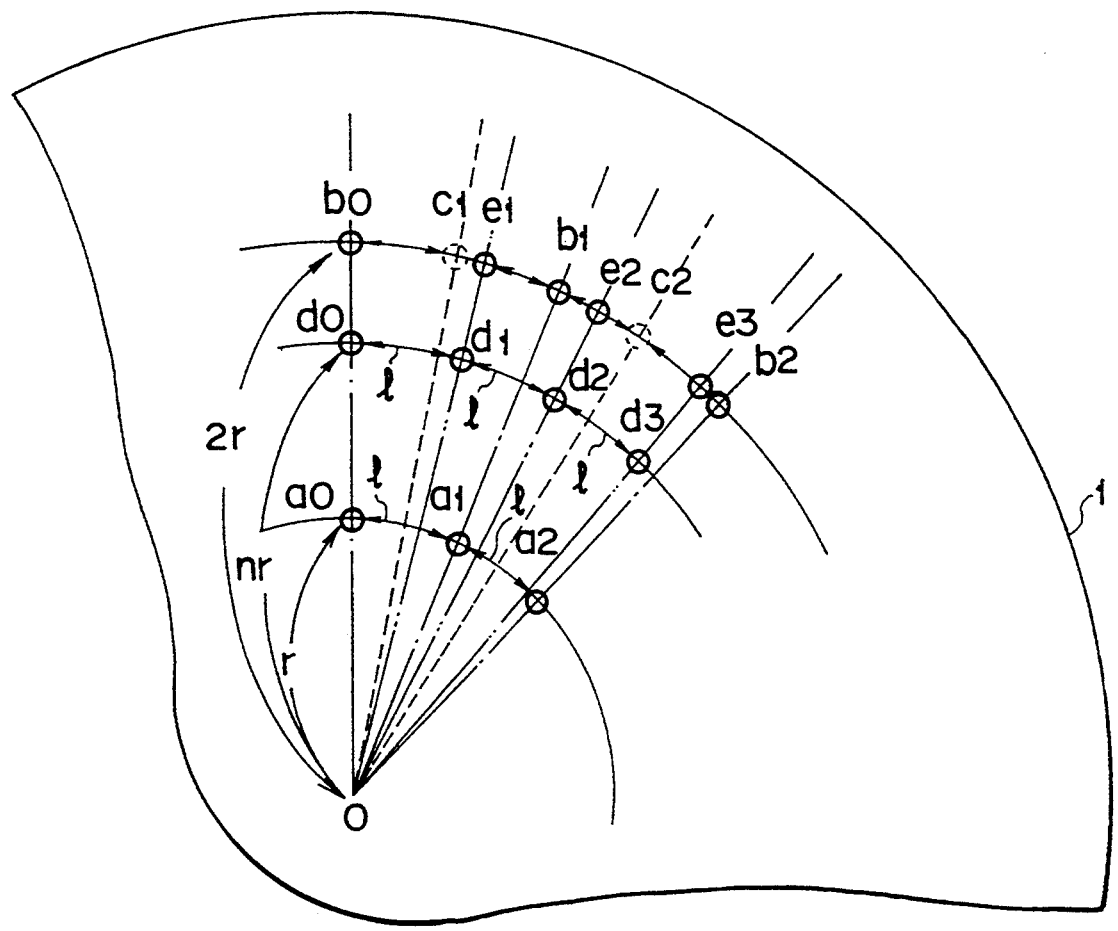
FIG. 10 is a view for explaining a formation state of pits on the optical disk shown in FIG. 1.

Therefore, as shown in FIG. 10, pits are formed in an order of $a_0, a_1, a_2, \ldots$, with an constant pit interval l (a certain predetermined interval) therebetween on a track having a radius r and formed in an order of $b_0, b_1, b_2, \ldots$, with a pit interval 2l therebetween on a track having a radius 2r because the rotation speed, i.e., the angular velocity of the optical disk 1 is constant. For this reason, a recording capacity per track is the same at the circumferential positions of radii r and 2r.

A characteristic curve G2 shown in FIG. 9 indicates a characteristic of the information transfer clock CK1 obtained in a CLV (Constant Linear Velocity; a linear density is constant) method. The frequency of the clock CK1 is linearly increased in proportion to the radial position on the optical disk 1.

That is, while the frequency of the information transfer clock CK1 at the position of the radius r on the optical disk is "f", it is doubled to be "2f" at the position of a doubled radius, i.e., the radius 2r.

Therefore, while pits are formed in an order of $a_0', a_1, a_2, \ldots$, with a pit interval "l" therebetween on a track having the radius E, they are formed in an order of $b_0, c_0, b_1, c_1, b_2, c_2, \ldots$, with the pit interval "l" therebetween on a track having the radius 2r where the frequency of the information transfer clock CK1 is doubled to be "2f". Therefore, a recording density (pit interval) remains constant regardless of whether the position is in an inner or outer portion of the optical disk 1.

However, as described above, strictness in recording conditions in an outer portion of the optical disk 1 is undesirably increased in the recording method according to the above constant recording density method.

The characteristic curve G3 indicates the characteristic of the information transfer clock CK1. The frequency of the clock CK1 is increased stepwise in proportion to the radial position on the optical disk 1 until the predetermined radial position nr and is rendered a constant frequency nf at a radial position outside the predetermined radial position hr.

Therefore, as shown in FIG. 10, pits are formed in an order of $a_0, a_1, a_2, \ldots$, with the pit interval "l" therebetween on a track having the radius r and formed in an order of $d_0, d_1, d_2, \ldots$, with the pit interval "l" therebetween on a track having the radius nr. That is, since recording is performed by the constant linear velocity method within the range of the radii E to 2r, a recording density is constant.

Note that since the information transfer clock CK1 changes stepwise, it cannot be said in the strict sense of the word that the recording density on the tracks is constant. However, the linear density can be said to be substantially constant because a change in frequency in one step is small as will be described later.

Pits are formed by the information transfer clock CK1 having the predetermined frequency nf in a radial position larger than the radius nr.

Therefore, while pits are formed in an order of d0, d1, d2, ..., ..., on a track having the radius nr, they are formed in an order of $e_0, e_1, e_2 \ldots$, on a track having the radius 2r, i.e., the recording density is decreased as the radial position moves outward. That is, since pits are formed by the CAV method within a range larger than the radius nr, a recording capacity per track remains constant.

Figure 11:
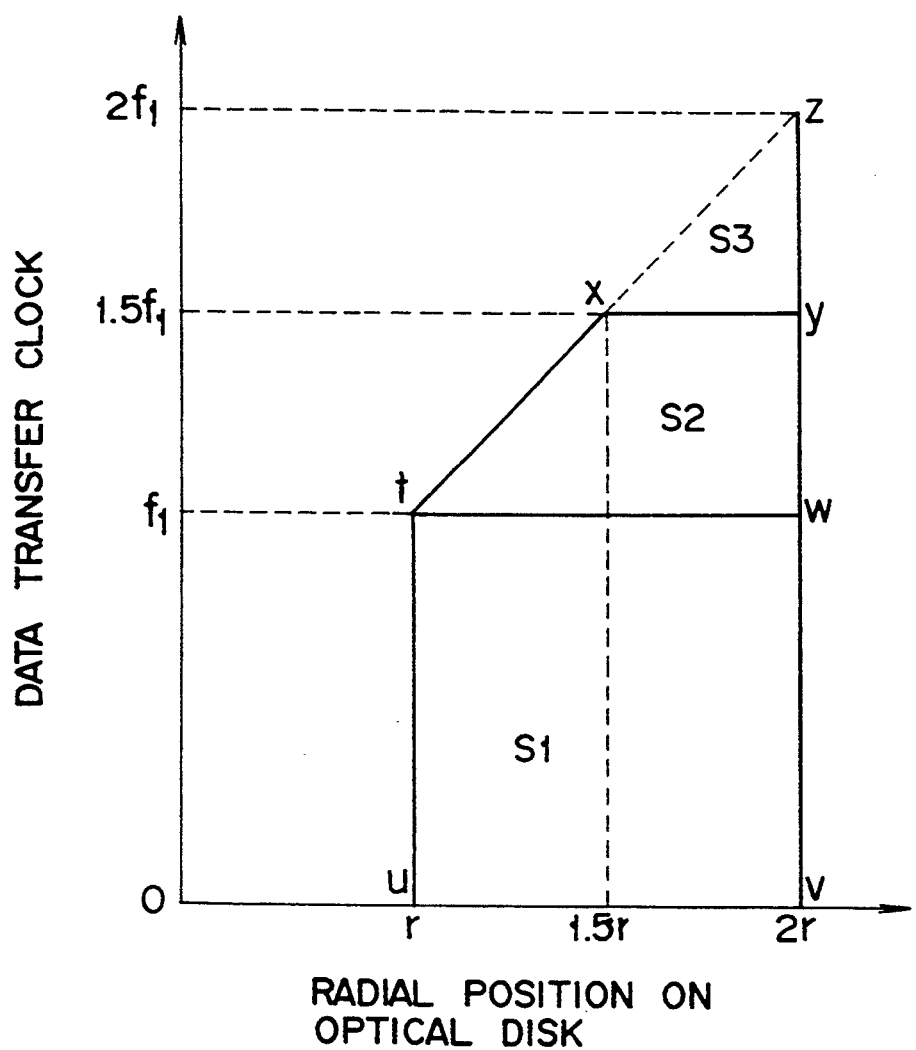
FIG. 11 is a graph for explaining a memory capacity of information on the optical disk shown in FIG. 1.

By controlling the information transfer clock CK1 as indicated by the characteristic curve G3, the recording capacity of the optical disk 1 becomes as shown in FIG. 11. That is, the memory capacity obtained when recording is performed by the CAV method using the information transfer clock CK1 at a frequency $f_1$ from the radii r to 2r on the optical disk rotated at a constant rotation speed can be represented by an area S1 of a rectangle tuvw.

When recording is performed by the constant linear velocity method, the information transfer clock CK1 changes from $f_1$ to $2f_1$ as the radial position changes from r to 2r. Therefore, since the recording capacity is increased by an area (S2+S3) of a triangle twz, i.e., by the half of the area S1, the entire recording capacity is increased 1.5 times.

However, the recording conditions become strict as the radial position moves outward as described above. Therefore, assuming that recording is to be performed at a constant frequency $1.5f_1$ in a portion outside a predetermined radial position, e.g., a position at a radius 1.5r, the recording capacity is increased by an area S2 of a trapezoid twyx as compared with recording performed by the CAV method. That is, when the information transfer clock CK1 indicated by the characteristic curve G3 according to the present invention is used, the recording capacity becomes 1.375 times that obtained by the CAV method.

Figure 12:
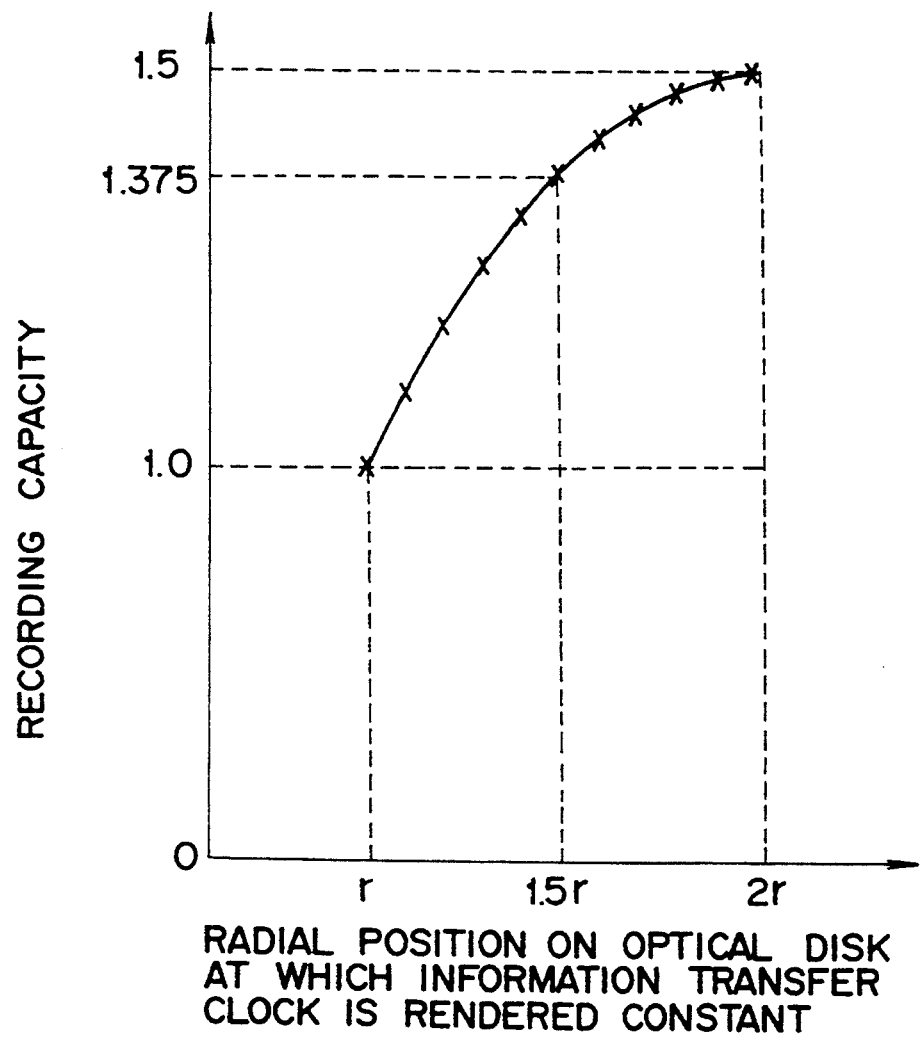
FIG. 12 is a graph for explaining a relationship between a memory capacity of information and a radial position for maintaining an information transfer clock constant on the optical disk shown in FIG. 1.

Note that the recording capacity is of course changed by the radial position by which the frequency of the information transfer clock CK1 is rendered constant. The results of calculating a change in recording capacity with respect to the radial position by which the clock CK1 is rendered constant are shown in Table 1, and a relationship between the recording capacity and the radial position by which the information transfer clock CK1 is rendered constant is shown in FIG. 12.

TABLE 1

| Radial position | Recording capacity |
|---|---|
| 1.0 r | 1.0 |
| 1.1 r | 1.095 |
| 1.2 r | 1.18 |
| 1.3 r | 1.255 |
| 1.4 r | 1.32 |
| 1.5 r | 1.375 |
| 1.6 r | 1.42 |
| 1.7 r | 1.455 |
| 1.8 r | 1.48 |
| 1.9 r | 1.495 |
| 2.0 r | 1.5 |

In addition, as shown in FIG. 9, the information transfer clock CK1 is changed not linearly but stepwise in accordance with the radial position within the range of radii r to nr.

With the above arrangement, designing of the variable frequency divider 61 becomes easier.

To change the data transfer clock CK1 stepwise, set data S13 by which the clock CK1 is changed stepwise for every predetermined track number is prepared in the conversion table 4a formed in the ROM of the controller 4. A change in frequency per step in this stepwise change is determined as follows.

Generally, a reproduction signal from the optical disk 1 is not synchronized with the information transfer clock CK1. Therefore, a clock CK2 to be supplied to the information demodulator 40, the control signal decoding/removing circuit 41, the deinterleave circuit 42, the error correcting circuit 43, and the buffer memory 44 is generated by separating a clock from a self clock included in a reproduced digital-modulated signal. This separation of the clock is performed by a PLL (phase-locked loop) controller 40a as a clock separator.

Figure 13:
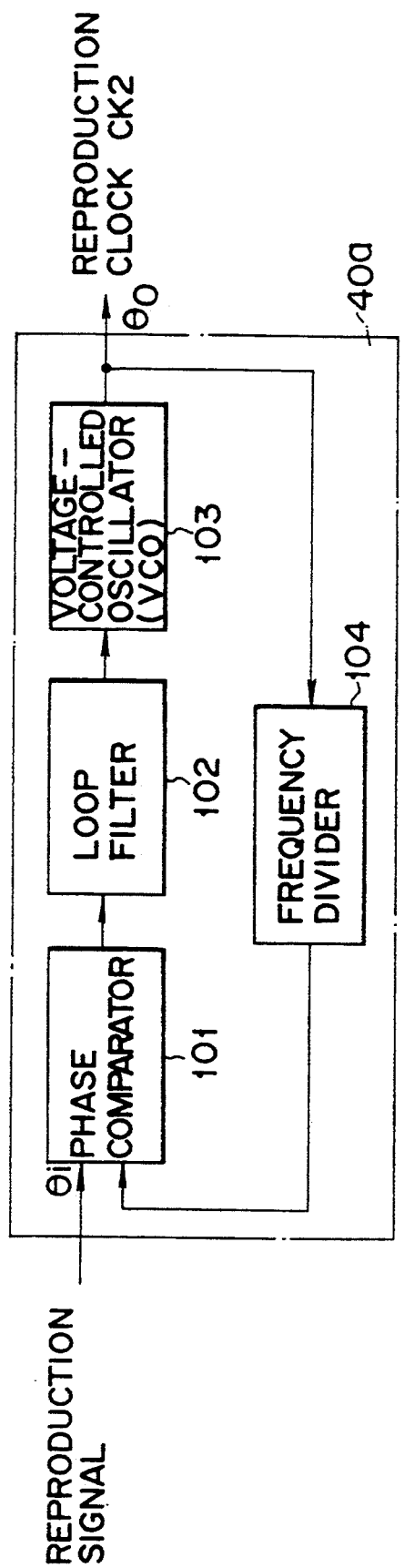
FIG. 13 is a block diagram showing a basic arrangement of a PLL controller shown in FIG. 1.

As shown in FIG. 13, the PLL controller 40a is basically constituted by a phase comparator 101, a loop filter 102, a voltage-controlled oscillator (VCO) 103, and a frequency divider 104, and these elements form a feedback loop.

Figure 14:
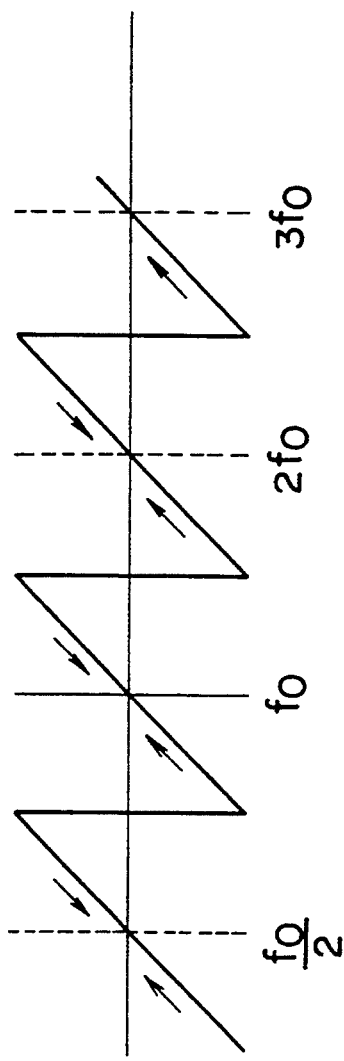
FIG. 14 is a timing chart for explaining an operation of the PLL controller shown in FIG. 1.

A binary signal of a reproduction signal from the optical disk 1 is generally digital-modulated. To separate a self-clock signal included in this digital-modulated binary signal, the binary signal is supplied to the phase comparator 101. Only upon receiving an input pulse, the phase comparator 101 compares a phase $\theta i$ of the input with a phase $\theta i$ of an output. FIG. 14 shows a phase comparison characteristic of the phase comparator 101.

Since comparison with the phase of an output is performed only when the edge of an input pulse is supplied as described above, a plurality of frequencies for locking the phase are present as shown in FIG. 14.

Figure 15:
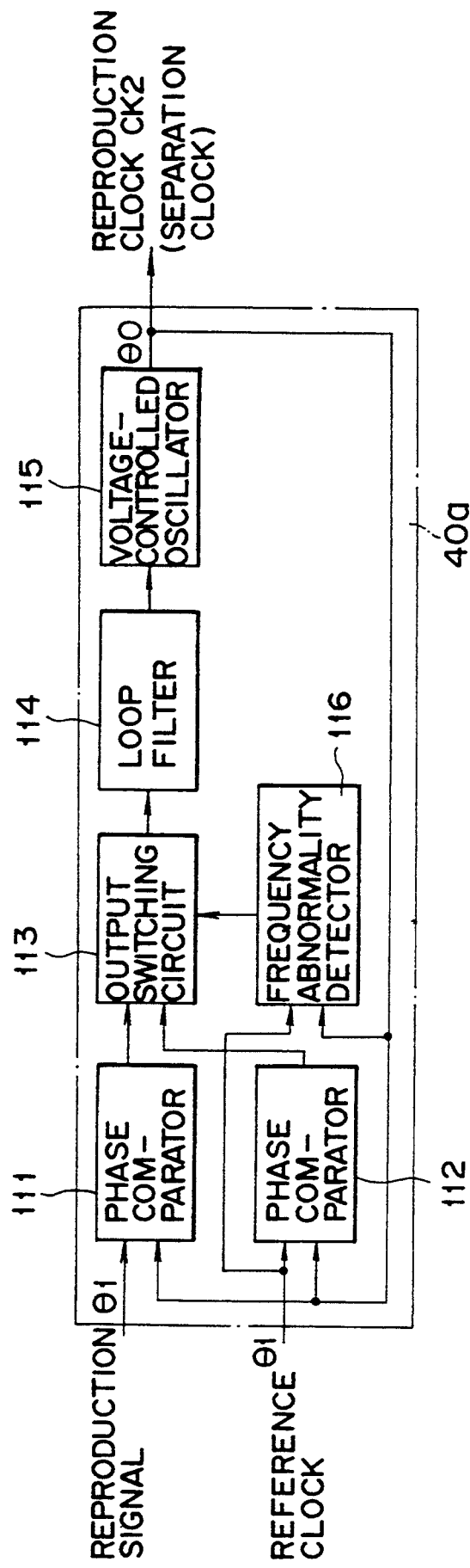
FIG. 15 is a block diagram showing an arrangement of the PLL controller as a clock separator shown in FIG. 1.

For this reason, the PLL controller 40a is actually constituted by phase comparators 111 and 112, an output switching circuit 113, a loop filter 114, a voltage-controlled oscillator (VCO) 115, and a frequency abnormality detector 116, as shown in FIG. 15. With this arrangement, the PLL controller 40a correctly separates a clock from a digitally modulated signal by using the frequency abnormality detector 116 during reproduction.

In the arrangement shown in FIG. 15, assume that when addresses at different radial positions are to be accessed, a phase loop according to an input of a frequency $\theta i$ of a transfer clock corresponding to the address is functioned to perform comparison at a frequency $f_0$. In this state, the output switching circuit 113 performs switching from the phase comparator 112 to the phase comparator 111 to lock the phase when the access is performed, thereby correctly separating a clock to enable decoding of the address or the like.

In this case, since recording is performed while the information transfer clock CK1 is changed stepwise, a frequency changes at a switching portion. For this reason, if a frequency difference is large in one of these steps and access is performed on a track having a frequency different from that of the information transfer clock predetermined upon access, no correct phase locking can be performed to disable address decoding.

Therefore, the frequency difference is set to be smaller than a decoding limit for digitally modulated information using frequencies of adjacent information transfer clocks. As a result, even if an area of an adjacent information transfer clock different from a designated clock is accessed, an address can be correctly decoded to enable reaccess to a target address.

For example, the information decoding limit of 2-7 code modulation as one digital modulating method is ±6.25%. In this case, therefore, frequency abnormality detection is set to be 6% or less, and a change in one step of the information transfer clock is set to be smaller than that.

Therefore, a change in information transfer clock per step in the stepwise change of the clock need only be about 1%. As a result, designation of the information transfer clock is facilitated, and the problem in access is solved.

A margin in recording laser power with respect to the radial position on the optical disk 1 will be described next.

In heat mode recording in which recording pits are formed by the heat energy of a focused laser beam, the energy density of a focused spot is constant regardless of the radial position on the optical disk 1. Under this recording condition, the energy density of a focused spot is determined by a product of an optical output P (W : watt) and a pulse width Tp (s : second) of a laser, i.e., an energy "$J = P \times Tp$" and the sensitivity of the optical disk 1.

In this recording mode, recording is required to be performed as fast as possible while the magnitude of the laser beam output is limited. In this case, if a recording range is doubled with respect to the radial position, the linear velocity in an outer portion becomes twice that in an inner portion provided that a rotation speed is constant. To obtain the same recording conditions in the inner and outer portions, the recording energy must be maintained constant to remove an effect of the linear velocity. For this purpose, the energy in the outermost portion is preferably "$J2 = (2P1) \times (Tp1/2) = J1$" for an energy "$J1 = P1 \times Tp1$" in the inner portion. However, it is difficult to limit the laser power in an actual system. Therefore, the recording conditions in the constant linear velocity method according to the constant rotation speed become very strict.

FIG. 16 shows the margin characteristic of recording laser power. That is, the recording laser power margin with respect to the radial position on the optical disk 1 falls within range surrounded by solid lines a and c. Note that in FIG. 16, the recording pulse width Tp is constant regardless of the radial position on the optical disk 1. Determination of the recording pulse width Tp, optimization of a recording pit interval, and the like are performed at the innermost radius r of the optical disk 1, thereby recording data while the recording laser power is changed. The upper and lower limits of a reproducible recording laser power in reproduction of the recorded data are represented by $P_1$ and $P_2$, respectively.

The lower limits of the recording laser power at the respective radial positions on the optical disk 1 are indicated by the solid line a. That is, the limit is p2 at the inner radius r and p4 at the outer radius 2r, and "p4>p2". This is because the linear velocity is large (doubled) in the outer portion, and higher recording laser power is required due to this effect of the linear velocity in this portion.

The upper limits of the recording laser power at the respective radial positions are indicated by the solid polygonal line c. Note that a broken line b in FIG. 16 indicates the upper limit of the recording laser power obtained by the constant recording density method.

The recording method according to the present invention will be described below in comparison with the constant recording density method. In the constant recording density method, the upper limit of the recording laser power is represented by $P_1$ at the inner radius r on the optical disk 1 and p3 at the outer radius 2r thereon, and "P3<P1". This is because, when the recording laser power is increased under the constant recording pulse width Tp, the size of a formed recording pit is increased as the radial position on the optical disk 1 moves toward the outer portion of the disk. As a result, the margin of the recording laser power is decreased. This recording laser power margin is preferably as wide as possible in terms of long-term stability, reliability, and the like of the apparatus.

In addition, the margin is preferably constant regardless of the radial position on the optical disk 1.

Therefore, as described above, recording is performed by the CAV method in the outer portion of the optical disk 1 from, e.g., the radius 1.5r of the disk. As a result, the upper limit of the recording laser power indicated by the broken line b changes as indicated by the solid polygonal line c to largely widen the recording laser power margin in the outer portion. That is, as the optical head 5 moves from the inner to outer portions of the optical disk 1, although a relative linear velocity between the optical head 5 and the optical disk 1 is increased, a recording pit interval is increased accordingly. Therefore, reproduction is not easily adversely affected even when the size of a recording pit is increased due to an increase in the recording laser power.

As described above, since the margin of the recording laser power in the outer portion of the optical disk 1 is increased by applying the present invention, recording and reproduction can be stably performed even in this outer portion.

Figure 17:
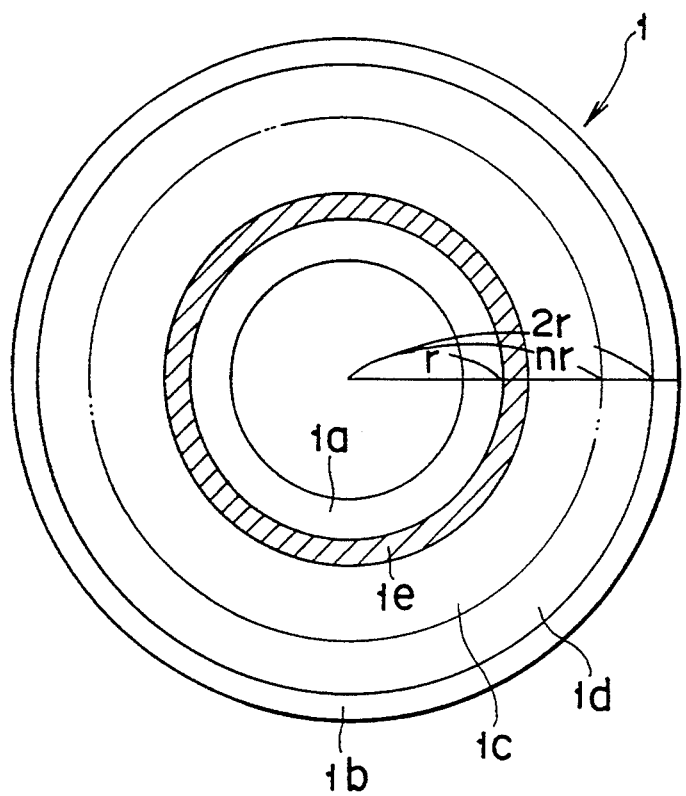
FIG. 17 is a plan view showing an arrangement of recording areas and alternate track areas on the optical disk shown in FIG. 1.

In a predetermined area in the inner portion of the optical disk 1, a substituting block region (substituting region) 1e as indicated by a hatched portion in FIG. 17. Referring to FIG. 17, reference symbol 1a denotes a non-recording area formed in the inner portion of the optical disk 1; and 1b, a non-recording area formed in the outer portion of the optical disk 1.

An area from the radii 2 to 2r of the optical disk 1 is a data recording area in which recording is performed by the constant recording density method in an area indicated by 1c and by the CAV method in an area indicated by 1d. The alternate block area 1e is formed in a portion of the area in which recording is performed by the constant recording density method.

The alternate block area 1e is used as follows. That is, in the manufacture of the optical disk 1, defective blocks are determined by reading preheaders (the block headers A). In accordance with the determination result, position information of each defective block is recorded in a portion of the alternate block area 1e, and a substituting block for this defective block is kept in the alternate block area 1e.

In information recording, a read after write operation, i.e., recording and reproduction are performed under the control of the controller 4 to check whether recorded data can be normally reproduced. If data cannot be normally reproduced even after correction by the error correcting circuit 43, a corresponding block is determined to be a defective block, and position information of this defective block is recorded in a portion of the alternate block area 1e. In addition, a substituting block for the defective block is kept in the alternate block area 1e.

In this manner, alternate blocks for detected defective blocks are sequentially kept in the defective block area 1e. In recording or reproduction, on the other hand, the defective block position information recorded in a portion of the defective block area 1e is referred. If it is determined that a block described in the defective block position information is accessed, alternate processing is performed such that recording or reproduction is performed for the alternate block kept in the alternate block area 1e in place of the defective block.

By providing the above alternate processing means, a user can handle the optical disk 1 having defective blocks as if he or she uses a normal disk. Therefore, the optical disk 1 can be effectively used, and convenience in use of the disk can be improved.

The optical disk 1 for use in the optical disk apparatus which adopts the above recording method is manufactured by duplicating an recording original disk (not shown) formatted such that a recording density is maintained constant in an inner portion within the predetermined radial position described above and a recording capacity per track is maintained constant in an outer portion.

In this case, a radial position on the optical disk 1 at which a data transfer clock is rendered constant is determined in accordance with a track number between the formatting side of the optical disk 1 and the optical apparatus side using the disk. In addition, information related to defective blocks is also recorded in the manufacture of the disk.

Additional advantages and modifications will readily occur to those skilled in the art. Therefore, the invention in its broader aspects is not limited to the specific details, and representative devices shown and described. Accordingly, various modifications may be made without departing from the spirit or scope of the general inventive concept as defined by the appended claims and their equivalents.

What is claimed is:

1. A data reproducing apparatus for reproducing data from an optical disk having a fixed code section and a data recording section, the fixed code section having fixed widths to pit-to-pit distances is 1:n, n being a natural number, the data recording section having pits which are continuous with the pits of the fixed code section and which represent recorded data with pit widths and pit-to-pit distances, the data reproducing apparatus comprising:
   first detecting means for detecting pits on the disk and generating an analog signal corresponding to the fixed code data and the recorded data;
   second detecting means for detecting the fixed code data from the analog signal detected by the first detecting means and outputting a corresponding detection signal;
   determining means for determining an average value of the analog signal detected by the first detecting means while the second detecting means is detecting the fixed code data, thereby determining the average value based on the fixed code data detected by the second detecting means; and
   binarizing means for determining a binary representation of the analog signal detected by the first detecting means using the average value determined by the determining means as a slice level when the second detecting means is not detecting the fixed code data, thereby binarizing the recorded data in the analog signal by comparing the average value slice level with a threshold level.

2. The apparatus according to claim 1, wherein the determining means includes:
   a switch which is turned on in response to the detection signal;
   a delay circuit which delays the analog signal detected by the first detecting means so that the analog signal is binarized by the binarizing means when the second detecting means is not detecting the fixed code data;
   a CR circuit which is charged while being supplied with an average value of the delayed analog signal when the switch is turned on; and
   means for comparing the delayed analog signal with the average value of the delayed analog signal.

3. A data reproducing apparatus for reproducing data from an optical disk having a fixed code section and a data recording section, the fixed code section having fixed code data represented by pits formed such that a ratio of pit widths to pit-to-pit distances is 1:n, n being a natural number, the data recording section having pits which are continuous with the pits of the fixed code section and which represent recorded data with pit widths and pit-to-pit distances, the data reproducing apparatus comprising:
   first detecting means for detecting pits on the disk and generating an analog signal corresponding to the fixed code data and the recorded data;
   second detecting means for detecting the fixed code data from the analog signal detected by the first detecting means and outputting a corresponding detection signal;
   determining means for determining a deviation value representing the deviation between the analog signal detected by the first detecting means and a predetermined signal level, while the second detecting means is detecting the fixed code data for determining the deviation value,
   wherein the determining means includes:

a switch which is turned on in response to the detection signal, a delay circuit which delays the analog signal detected by the first detecting means so that the analog signal is corrected by the correcting means when the second detecting means is not detecting the fixed code data, and a CR circuit which is charged when the switch is turned on and while being supplied with the delayed analog signal;

correcting means for correcting the analog signal detected by the first detecting means according to the deviation value determined by the determination means when the second detecting means is not detecting the fixed code data, thereby correcting the recorded data in the analog signal; and binarizing means for binarizing the analog signal corrected by the correcting means according to the predetermined signal level.

* * * * *